US009681252B2

(12) United States Patent
Dence

(10) Patent No.: US 9,681,252 B2
(45) Date of Patent: Jun. 13, 2017

(54) SERVICE PROVISIONING AND ACTIVATION IN TELECOMMUNICATIONS NETWORK

(71) Applicant: Comptel Corporation, Helsinki (FI)

(72) Inventor: Martin Dence, Vantaa (FI)

(73) Assignee: Comptel Corporation, Helsinki (FI)

(*) Notice: Subject to any disclaimer, the term of this patent is extended or adjusted under 35 U.S.C. 154(b) by 0 days.

(21) Appl. No.: 15/100,319

(22) PCT Filed: Dec. 1, 2014

(86) PCT No.: PCT/FI2014/050939
§ 371 (c)(1),
(2) Date: May 30, 2016

(87) PCT Pub. No.: WO2015/079122
PCT Pub. Date: Jun. 4, 2015

(65) Prior Publication Data
US 2016/0302022 A1   Oct. 13, 2016

(30) Foreign Application Priority Data

Nov. 29, 2013 (EP) .................................... 13397542

(51) Int. Cl.
*H04M 3/00* (2006.01)
*H04W 4/00* (2009.01)
(Continued)

(52) U.S. Cl.
CPC ............. *H04W 4/001* (2013.01); *H04W 8/18* (2013.01); *H04W 28/10* (2013.01)

(58) Field of Classification Search
CPC ....... H04W 8/18; H04W 28/10; H04W 4/001; H04W 8/06; H04W 8/04; H04W 40/244;
(Continued)

(56) References Cited

U.S. PATENT DOCUMENTS 7,768,909 B1 * 8/2010 Parlamas ................ H04L 47/10
370/229
8,948,726 B2 * 2/2015 Smith ..................... H04W 8/183
455/406

(Continued)

FOREIGN PATENT DOCUMENTS

CN        WO 0057666 A3 * 10/2002   ......... H04L 12/5602
WO        WO0057666 A2    9/2000

*Primary Examiner* — Mahendra Patel
(74) *Attorney, Agent, or Firm* — Seppo Laine Oy

(57) ABSTRACT

A method (and related system and computer program product) of provisioning and activating subscriber services in telecommunications network elements in a telecommunication network of a network operator is disclosed. The method comprises receiving subscriber service requests sent from a plurality of source systems, for each received request, sending a positive or negative acknowledgement of the request back to the respective source system based on whether the request was properly received or not, for each positively acknowledged request, determining a series of operations necessary to be performed in a group of telecommunications network elements in order to fulfill the subscriber service request, and performing the determined series of operations whereby at least one change of state occurs in each element in said group of telecommunications network elements. The method is executed in a system environment with a limited total processing power for processing service requests from receipt to respective changes in the telecommunications network elements, and is characterized in that if the processing load imposed by all the received requests exceeds the total processing power, delaying the sending of the positive and/or negative acknowledgements back to the respective source system.

21 Claims, 5 Drawing Sheets

(51) Int. Cl.
*H04W 8/18* (2009.01)
*H04W 28/10* (2009.01)

(58) Field of Classification Search
CPC ....... H04W 4/12; H04W 4/00; H04M 1/2535;
H04M 11/10; H04L 47/10; H04L 63/102;
H04L 47/18; H04L 47/12
USPC .......................... 455/418; 370/468; 710/264
See application file for complete search history.

(56) References Cited

U.S. PATENT DOCUMENTS

| | | | |
|---|---|---|---|
| 2005/0096059 A1* | 5/2005 | Jiang | H04W 48/08 455/450 |
| 2006/0035589 A1* | 2/2006 | Shvodian | H04L 1/1858 455/18 |
| 2010/0118704 A1* | 5/2010 | Pongracz | H04L 43/0864 370/235.1 |
| 2010/0131668 A1* | 5/2010 | Kamath | H04L 47/32 709/233 |
| 2010/0274893 A1 | 10/2010 | Abdelah et al. | |
| 2011/0159843 A1* | 6/2011 | Heath | H04W 8/18 455/411 |
| 2011/0161488 A1 | 6/2011 | Anderson et al. | |
| 2011/0294472 A1* | 12/2011 | Bramwell | H04W 8/04 455/413 |
| 2012/0134300 A1* | 5/2012 | Buck | G06F 8/61 370/259 |
| 2013/0304616 A1* | 11/2013 | Raleigh | G06Q 20/145 705/34 |

* cited by examiner

SERVICE PROVISIONING AND ACTIVATION IN TELECOMMUNICATIONS NETWORK

FIELD OF THE INVENTION

The present invention relates to the provisioning and activation of subscriber services in telecommunications network elements in a telecommunication network, which network has a limited total processing power for processing service requests received from a plurality of source systems.

In particular, the present invention relates to the provisioning and activation of subscriber services in cellular networks, also called as mobile networks. Examples of such cellular network or mobile networks include wireless networks utilizing GSM, GPRS, EDGE, UMTS, HSDPA and/or LTE technologies.

In an embodiment, the invention relates to controlling the processing power available to any one source system (or a plurality of source systems) so that each source system is provided with a minimum processing power value.

The invention is related to a method according to the preamble of claim 1, a system according to the preamble of claim 12 and a computer program product according to the preamble of claim 14.

BACKGROUND OF THE INVENTION

A typical communications, data or service network is owned and run by a network operator. The network typically comprises a plurality of network elements to enable it to provide services directly to its own subscribers or end users. However, it is common for service operators to piggy back on the network (and in particular to use the network elements of the network) to enable it to provide its own services to its own subscribers or end users. In some countries, it is compulsory for the network operator to allow service operators (also sometimes referred to as "virtual operators") to hire network facilities from traditional network operators. The service operators thus make use of some of the network elements provided by the network operator, with the services provided by a service operator very often differing, to various degrees, from the services provided by another service provider.

The network operator and the service operator/s typically both make use of a provisioning system (either separate provisioning systems or the same provisioning system) to assist in the provisioning and activation of subscriber services. The provisioning system will be referred to a source system in this document, with the source system thus sending subscriber service requests to the network elements, with these requests therefore needing to be processed, managed and controlled.

Network operators and service operators have diverse requirements, ranging from having to deal with rapidly rising requests for services to having to be able to rapidly introduce a new service in a saturated market. Also, the number and complexity of available telecommunications services increase every day. Thus, providing source systems (and ultimately their subscribers) with requested services in a timely and correct manner is ideal, but sometimes difficult (if not impossible, in certain circumstances).

If the subscriber service requests to the network elements are not controlled, it may lead to more favourable treatment of one source system when compared to another. It has typically to date not been possible to favour or hinder the processing of service requests from any particular source system, which has often led to a worse than expected provisioning and activation of the requested service. In this regard, and in view of the fact that not all service requests are processed in the same way and that different source systems place different demands on the network, the following factors need to be considered:

1. Some requests are quicker than others, i.e. the number of tasks generated per request can vary.
2. Different source systems send requests at different rates. For example, they can send them evenly over time, or they can send them in bursts or batches.
3. Network elements can be offline, thus requiring additional processing.
4. The inactivity of one source system should not limit the activity of others.
5. Some kind of a control over the processing of the requests would be appropriate when the network and/or the provisioning and activation system is overloaded.
6. The number of active requests and connections for each source system also affects how many requests the source systems can push in. Here, the connections refer to a situation wherein a plurality of clients (client systems) are connected to a same one source system and simultaneously send subscriber service requests through this one source system. Thus, each source system can have a one or more than one clients through which the subscriber service requests are placed.

Clearly, there are many factors to consider and to provide a solution which can adjust to all possible situations is not practically possible.

It is thus an aim of the present invention to guarantee that each source system gets a minimum percentage of the requested processing power to process its service requests, when the network is overloaded.

BRIEF SUMMARY OF THE INVENTION

According to a first aspect of the invention, there is provided a method of provisioning and activating subscriber services in telecommunications network elements in a telecommunication network of a network operator, the method comprising:
  receiving subscriber service requests sent from a plurality of source systems;
  for each received request, sending a positive or negative acknowledgement of the request back to the respective source system based on whether the request was properly received or not;
  for each positively acknowledged request, determining a series of operations necessary to be performed in a group of telecommunications network elements in order to fulfil the subscriber service request; and
  performing the determined series of operations whereby at least one change of state occurs in each element in said group of telecommunications network elements;
  wherein the method is executed in a system environment with a limited total processing power for processing service requests from receipt to respective changes in the telecommunications network elements.

Further according to the first aspect, the method comprises delaying the sending of the positive and/or negative acknowledgements back to the respective source system, if the processing load imposed by all the received requests exceeds the total processing power.

In an embodiment, the method comprises:
  defining, in an allocation rule set, guaranteed processing power values for at least some of the source systems;

comparing the processing loads imposed by the requests received from individual source systems against the respective guaranteed processing power values; and when the processing load imposed by all the received requests exceeds the total processing power, delaying the sending of the acknowledgements back to at least one source system that sends requests at a higher rate than can be processed using the processing power guaranteed for the respective source system.

In an embodiment, the method comprises:

using a prediction model to calculate an expected future rate of receipt of requests for each individual source system; and making decisions on whether or not to delay the sending of the acknowledgements back to at least one individual source system, wherein the decisions are made on the basis of at least the respective expected future rates and the allocation rule set.

In an embodiment, using of the prediction model includes:

monitoring the received requests and determining a first rate of receipt and a second rate of receipt for each individual source system, wherein the first rate of receipt is over a first time period and the second rate of receipt is over a second time period, which is shorter and generally more current than the first time period; and comparing the second rates against the respective first rates.

In an embodiment, the method comprises:

determining, in the allocation rule set, a threshold for free processing power of the system environment;

monitoring the amount of free processing power of the system environment; and when the amount of free processing power is equal to or less than the threshold, selecting at least one of the source systems for load limitation, wherein the load limitation includes delaying the sending of the acknowledgements.

In an embodiment, the method comprises deciding a length of the delay applied on the acknowledgements directed to a source system according delay rules in the allocation rule set.

In an embodiment, the method comprises periodically updating the decision with respect to the delaying of the acknowledgements.

In an embodiment, the source systems include at least one service provisioning system of the network operator. Alternatively, or in addition, the source systems include at least one service provisioning system of a virtual operator operating in the telecommunications network.

In an embodiment, the method comprises applying delays of different length on requests from different source systems.

According to a second aspect of the invention, there is provided a provisioning and activation system for a telecommunications network of a network operator, the provisioning and activation system configured to instruct telecommunications network elements in the telecommunication network to activate subscriber services, the provisioning and activation system and/or the telecommunications network elements having a limited total processing power for processing service requests from receipt to respective changes in the telecommunications network elements, the provisioning and activation system comprising:

means for receiving subscriber service requests sent from a plurality of source systems;

means for sending, with respect to each received request, a positive or negative acknowledgement of the request back to the respective source system based on whether the request was properly received or not;

means for determining, with respect to each positively acknowledged request, a series of operations necessary to be performed in a group of telecommunications network elements in order to fulfil the subscriber service request;

means for sending instructions for performing the determined series of operations in each element in said group of telecommunications network elements; and means for maintaining an allocation rule set for allocating the total processing power between the service requests received from different source systems;

wherein the provisioning and activation system is configured to delay the sending of the positive or negative acknowledgement of the request back to the respective source system, when at least one of the source systems sends more service requests than allowed according to the allocation rule set.

According to a third aspect of the invention, there is provided a computer program product for a provisioning and activation system for provisioning and activating subscriber services in telecommunications network elements in a telecommunication network of a network operator, the computer program product comprising:

program code means for receiving subscriber service requests sent from a plurality of source systems;

program code means for sending, with respect to each received request, a positive or negative acknowledgement of the request back to the respective source system based on whether the request was properly received or not;

program code means for determining, with respect to each positively acknowledged request, a series of operations necessary to be performed in a group of telecommunications network elements in order to fulfil the subscriber service request;

program code means for sending instructions for performing the determined series of operations in said group of telecommunications network elements;

program code means for controlling the computer program product when executed in a system environment with a limited total processing power for processing service requests from receipt to respective changes in the telecommunications network elements;

the controlling means comprising an allocation rule set for allocating the total processing power between the service requests received from different source systems; and the controlling means being configured to delay the sending of the positive or negative acknowledgement of the request back to the respective source system, when at least one of the source systems sends more service requests than allowed according to the allocation rule set.

In an embodiment, the allocation rule set defines guaranteed processing power values for at least some of the source systems. The guaranteed processing power value refers to the minimum processing power that is available for processing the requests from the respective source system. Thus, the allocation rule set can also allow a source system to use more processing power than indicated by the guaranteed processing power value.

In another embodiment, the allocation rule set defines guaranteed processing power values for each source system.

In a further embodiment, the guaranteed processing power values for all or at least some of the source systems are given a default value.

In an embodiment, all or at least some of the guaranteed processing power values are based on agreements with the owners or managers or the like of the respective source systems.

In an embodiment, if there is no guaranteed processing power agreement for a source system, the guaranteed processing power value for the source system will be given a default value in the allocation rule set.

In a further embodiment, no source system has a defined guaranteed processing power value.

BRIEF DESCRIPTION OF THE DRAWINGS

In the following, the invention will be examined in more detail by means of exemplifying embodiments with reference to the attached drawings, in which.

DETAILED DESCRIPTION OF THE DRAWINGS

As described above, and with reference to FIG. 1, a telecommunications network 1 provides network services and is owned by a network operator. A network resources and management system 2 controls and manages the actual telecommunications network 1 and is also owned by the network operator.

Figure 1:
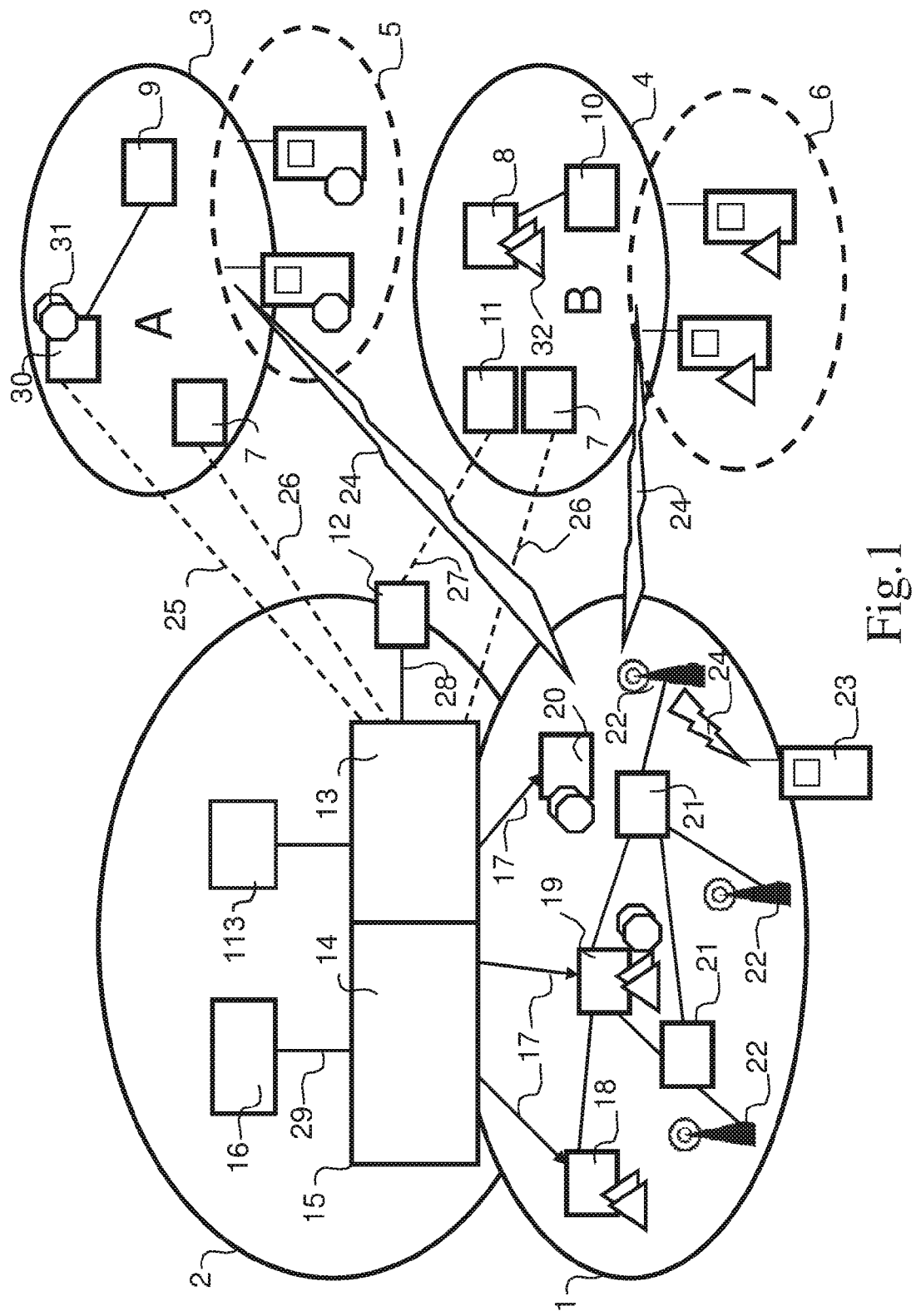
FIG. 1 shows a general block diagram of a provisioning and activation system according to an embodiment and associated other systems and elements.

Two service operators, namely service operator A 3 and service operator B 4, offer services provided by the network operator's network 1, with the service thus being hired from the network operator. The services offered by the service operators A 3 and B 4 may differ from each other. In addition, although only two service operators are shown in FIG. 1, clearly there may be very many more service operators.

Subscribers or end-users of services offered by service operator A are indicated with reference numeral 5, and corresponding subscribers or end-users of service operator B are indicated with reference numeral 6.

Element 7 monitors, configures and manages a provisioning system 15 (which will be described in more detail further below with reference to FIGS. 2 and 3) within the network 1 and within the limits defined by the network operator.

Block 8 represents a customer care system for service operator B.

Blocks 9 and 10 represent billing systems for service operator A 3 and service operator B 4, respectively.

Block 11 represents a client system for service operator B 4, and may take the form of an application, a web based user interface, a command line interface or the like. The client system 11 is one of the source systems for the provisioning system 15.

Block 12 is an application server, web server, command line interface server or the like within the network operator's network resources and management system 2, and is used to for generate provisioning requests in the provisioning system 15.

Block 13 is responsible for the access, usage, monitoring and configuration of the provisioning system 15 and block 14 is the provisioning engine of the provisioning system 15, which in an embodiment is used to implement the method and system according to embodiments of the present invention.

Block 16 is the network operator's operation support system 16, which typically includes client systems and billing systems.

Block 113 is a client system of the network operator's system that acts as a source system for the provisioning system 15. Of course, there can be several of such client systems 113 in the network operator's system.

Arrows 17 represent tasks to network elements 18, 19 and 20, such as SMSC, MMSC, the HLR of the network operator, content server, third party portal etc. Block 21 represents a further network element, e.g. MSC.

Elements 22 are interfaces to subscribers or end-users, e.g. base station antenna, xDSL connection or the like.

Icon 23 represents a subscriber or end-user of the network operator and 24 represents a communication connection, such as a radio interface between the network operator and the subscriber.

Line 25 shows service operator A's 3 connection for, in an embodiment, provisioning a subscriber, end-user or requesting a service, with the request, in an embodiment, being generated in the service operator A's 3 system. Line 26 shows service operator A's 3 and B's 4 connection for, in an embodiment, access, monitoring and configuration, and corresponding line 27 represents service operator B's 4 connection for provisioning a subscriber, end-user or requesting a service. Again, in an embodiment, the request is generated in the service operator B's 4 system.

Line 28 represents the connection between the provisioning system 15 and the application server, web server, command line interface server 12, or the like.

Line 29 represents the network operator's connection for provisioning a subscriber, end-user or requesting a service.

Block 30 is the service operator A's 3 client system for provisioning (e.g. CRM, customer care system) and block 31 is service operator A's 3 subscribers or end-users individual identification symbol. Similarly, block 32 is the service operator B's 4 subscribers or end-users individual identification symbol. The client system 30 acts as a source system for the provisioning system 15.

Figure 2:
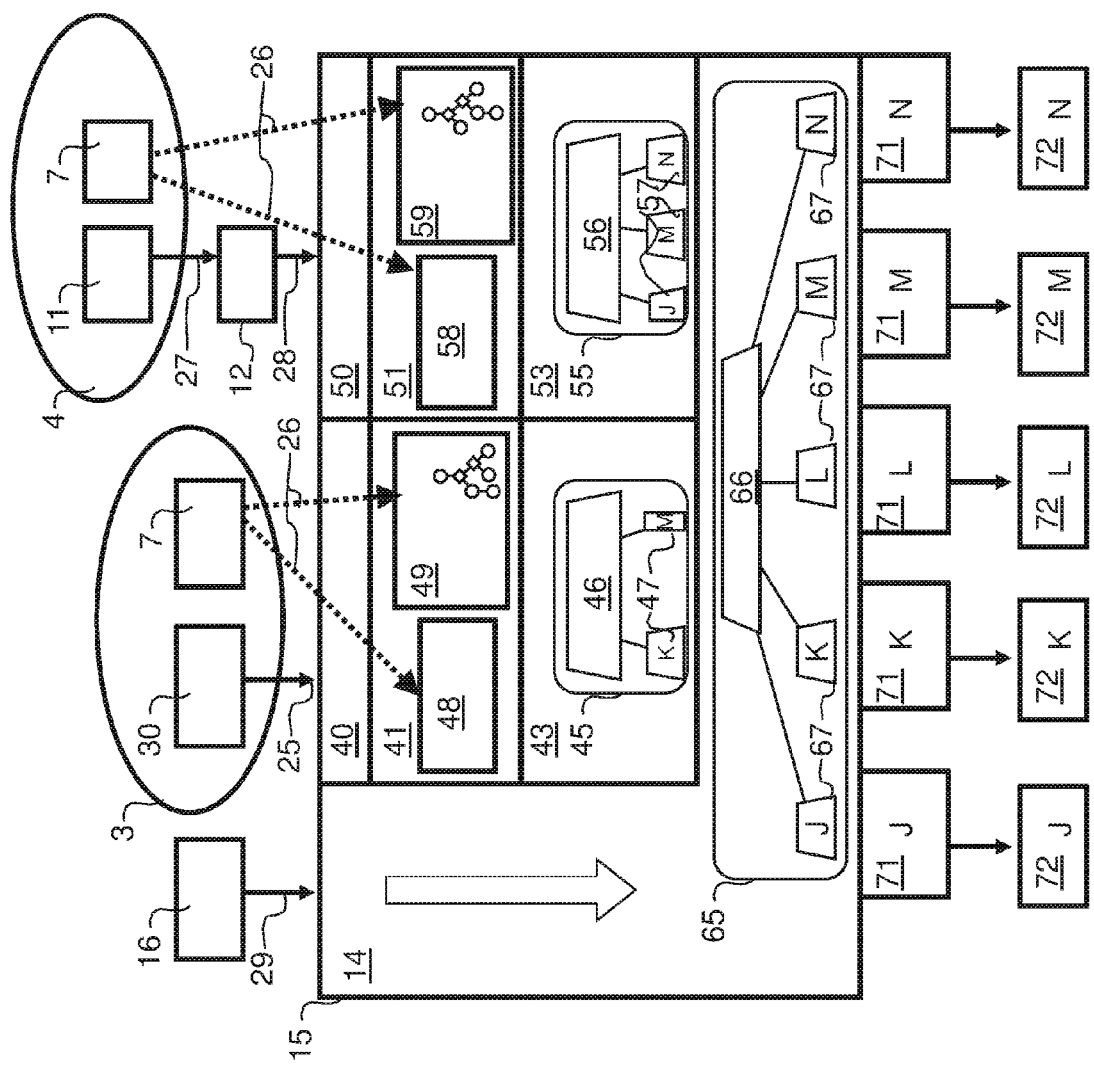
FIG. 2 shows a detailed block diagram of part of the system of FIG. 1, according to an embodiment.

Turning now to FIG. 2, block 40 represents an authentication module for service operator A's provisioning requests and access to the provisioning system 15. Block 41 shows the limited facilities for service operator A 3 to the provisioning system 15, and includes, for example, request processing rules, monitoring and configuration.

Block 43 shows an authorisation module for service operator A and block 45 shows a virtual network model in which authorisation rules for service operator A 3 are defined and managed by the network operator. Virtual network model 45 is based on the actual network resources defined by a network model 65, including limitations set by the network operator.

Block 46 is a provisioning host for service operator A 3. Provisioning host 46 determines limitations to network elements, such as, for example, the number of simultaneous provisioning connections to the network element from the provisioning host 46.

Blocks 47 represent allowed and allocated network resources for service operator A 3. Typically, the work operator defines and manages the network element resource limitations, for example, specified network elements or subscribers within a particular number range.

Block 48 monitors service operator A's request processing. Service operator A can monitor the processing of its own requests in the network operator's provisioning system 15.

Block 49 represents service operator A's 3 request processing configuration for provisioning. Service operator A 3 can configure its own provisioning rules in the network operator's provisioning system 15. The provisioning rules can contain, for example, mapping of a single request into multiple network level resources or parameter modifications or use of network resources to populate information into a provisioning request.

Service operator B 4 has a corresponding structure in the provisioning system 15.

Thus, the details will be omitted, but to summarise, block 50 represents an authentication module, block 51 shows the limited facilities for service operator B 4 to the provisioning system 15, block 53 shows an authorisation module, block 55 shows a virtual network model. Service operator B 4 also has a virtual network model 55, provisioning host 56, allowed and allocated network resources 57, a block 58 to monitor service operator A's request processing, and block 59 that represents service operator B's 4 request processing configuration for provisioning.

The network model 65 is a physical network model of the provisioning system 15. The network model 65 contains information about all network elements 72 provisioned by the provisioning system 15. This physical network model 65 is managed by the network operator.

Block 66 is the provisioning host in the physical network model and defines typically all the connections to the network elements 72 via network element representations 67. This includes, for example, the address of the network element 72 in the network, available user IDs and passwords to be used for provisioning, network element interface types 71, etc. to be used for the connection into the network element representation 67. This provisioning host 66 is managed by the network operator.

Blocks 67 thus represent network element resources that can be provisioned, and these have corresponding physical network elements 72, via network element interfaces 71. These network element representations 67 contain information about the properties of the network elements 72, such as the number of parallel provisioning connections that the network element 72 can support, when it can be accessed, how fast it can process provisioning commands etc. The network element representations 67 are managed by the network operator.

Figure 3:
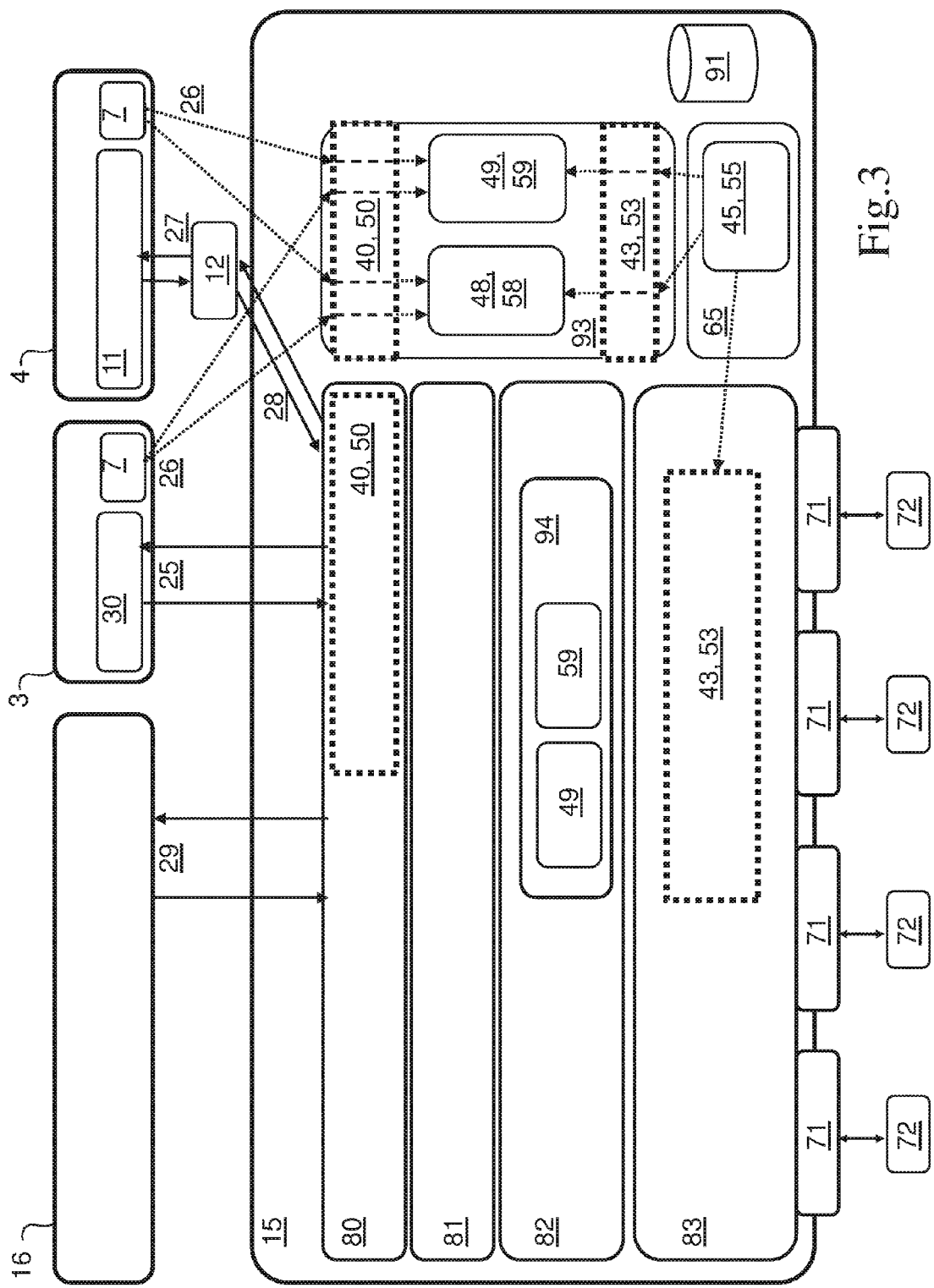
FIG. 3 shows another detailed block diagram of FIG. 2, according to an embodiment.

As shown in FIG. 3, the provisioning system 15 may be divided into different layers, namely a client system layer 80, a request processing layer 81, a service module layer 82 (which includes a logic execution module 94) and a task execution layer 83.

The client system layer 80 receives service requests, corresponding to lines 25 to 28 in the figures from the service operators A 3 and B 4 and the network operator's operation support system 16, converts these requests into a usable format and stores them in database 91. After the request has been executed and it has a final status, a response is delivered to the service operators A 3 and B 4 and the network operator's operation support system 16.

The request processing layer 81 forwards the provisioning requests in the correct order and at configured times to the other system layers. It does this on the basis of the requests' arrival times, desired execution order and prioritising rules. The layer 81 is able to make sure that there is always only one request under execution at a time for each subscriber.

The service module layer 82 comprises service modules that allow an operator, for example, to define rules for provisioning logics and enable functions such as rollback and routing.

The task execution layer 83 manages the execution of the tasks in the network elements 72. It communicates with the network elements through specified network element interface modules and directs the tasks to them in the correct formats.

At a high level, in use, the service module layer 82 receives requests from the request processing layer 81, sends network element specific operations (i.e. tasks) to the task execution layer 83, receives responses to tasks from it and sends the finalized request responses back to the request processing layer 81.

A database 91 is also provided for use by the provisioning system 15. A management user interface 93 is used for monitoring and configuration functions represented by blocks 48, 49, 58 and 59 for service operators 3, 4, as described above with reference to FIG. 2, within the limitations of virtual network models 45, 55 defined by the network operator. The interface 93 typically includes a description of the telecommunications management network where the provisioning solution operates, with this description providing information related to network elements, such as version management, connection specific settings and transport protocols. This interface also includes authorisation and authentication data, for example user names, passwords and user profiles, and further includes restrictions and limitations for service operators.

In use, service operators 3, 4 are allowed to use the provisioning system 15 through the authentication modules 40, 50, the management user interface 93 and the authorisation modules 43, 53 after the provisioning rules have determined the rights for the use of the network elements 18, 19, 20, 72. In doing this, the network operator is able to present and utilize one physical network in many logical views, each representing the portion accessible to the service operators 3, 4, and control the related limitations, authentication and authorization rules. The use means sending and receiving requests, via the provisioning system 15 (i.e. source system) to the network elements 18, 19, 20, 72, for configuring and monitoring the system.

Figure 4:
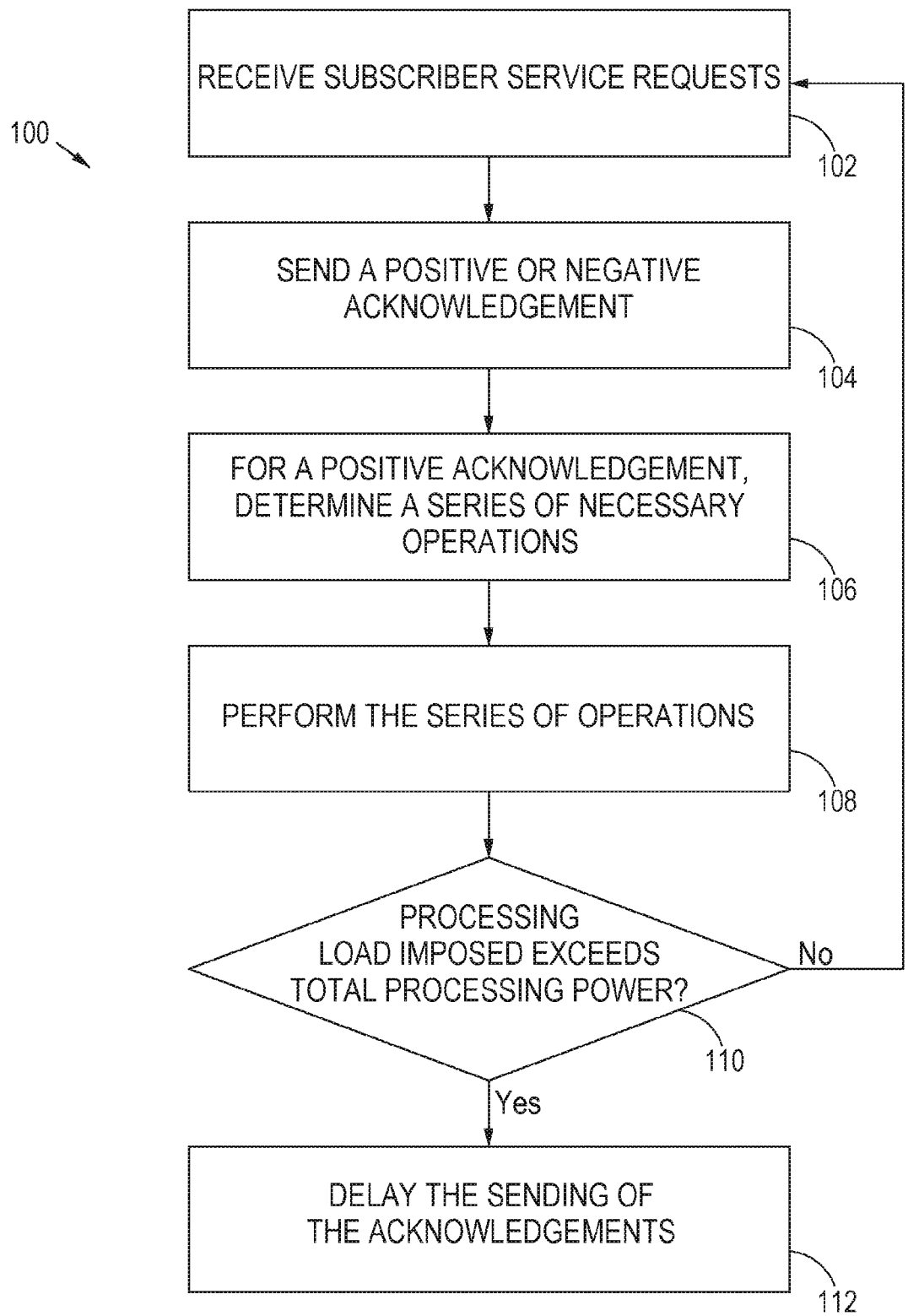
FIG. 4 shows a flow chart representing a method of provisioning and activating subscriber services, according to a further embodiment of the invention.

Turning now to FIG. 4, in accordance with the invention there is provided a method 100 of provisioning and activating subscriber services in telecommunications network elements in a telecommunication network of a network operator, such as telecommunications network elements 18, 19, 20, 72 described above. The source systems can be, for example, systems 11, 30 and/or 113 described above. The method 100 comprises receiving subscriber service requests sent from a plurality of source systems, as indicated by block 102, and for each received request, sending a positive or negative acknowledgement of the request back to the respective source system based on whether the request was properly received or not, as indicated by block 104.

For each positively acknowledged request, the method comprises determining a series of operations necessary to be performed in a group of telecommunications network elements 18, 19, 20, 72 in order to fulfil the subscriber service request, as described above, and as indicated by block 106.

The method 100 then comprises performing the determined series of operations whereby at least one change of state occurs in each element in said group of telecommunications network elements 18, 19, 20, 72, as indicated by block 108.

The method 100 is typically executed in a system environment with a limited total processing power for processing service requests from receipt to respective changes in the telecommunications network elements. In view of this, the method 100 then determines whether the processing load imposed by all the received requests exceeds the total processing power, as indicated by decision block 110. If so, the method 100 comprises delaying the sending of the positive and/or negative acknowledgements back to at least one of the source systems 11, 30 and/or 113, as indicated by block 112. As is discussed in more detail below, the delays to be applied to the acknowledgements can be set separately for each of the source systems. These delays can also be reset, reduced, or increased separately and individually for each of the source systems. On the other hand, when the processing load imposed by all the received requests is less that the total processing power, all the delays can be reduced or reset, or the method performed such that no delay is applied at all. In so doing, and bearing in mind that a source system can only have a limited amount of requests waiting to be acknowledged, the method 100 of the present invention ensures the processing power expectations of the source systems.

In an embodiment, the method 100 comprises defining, in an allocation rule set, guaranteed processing power values for at least some of the source systems. These are set according to the anticipated activity from each source system. If a source system, for example, is defined to have a low processing power but in practice sends many more requests than anticipated, then the sending of the positive and/or negative acknowledgements will be delayed relatively more. Each source system will thus be allocated a minimum proportion (of the overall throughput) of requests/tasks that it is expected to process within a certain period of time. The allocated minimum proportion of each source system can have a default value or a separately agreed value. In use, by slowing down the reception of new requests from a source system that has already exceeded its processing power target, the processing of requests from an underutilised source system will be hastened to help achieve the target. However, in an embodiment, this will only be applied if the underutilised source system is actually sending requests. If only one source system is sending requests then it should not be limited, just in the hope that another source system may suddenly start sending requests, except when the processing load imposed by the requests from said one source system exceeds the total processing power. The unused or underused processing power of a source system will be shared equally by the other source system to prevent this.

In an embodiment, the allocation rule set may be set up so that an acknowledgement in respect of a high priority request will not be delayed, but will be acknowledged immediately.

Thus, in use, the method comprises comparing the processing loads imposed by the requests received from individual source systems against the respective guaranteed processing power values. Then, when the processing load imposed by all the received requests exceeds the total processing power, the method comprises delaying the sending of the acknowledgements back to at least one source system that sends requests at a higher rate than can be processed using the processing power guaranteed for the respective source system.

In an embodiment, the method comprises using a prediction model to calculate an expected future rate of receipt of requests for each individual source system. The method then comprises making decisions on whether or not to delay the sending of the acknowledgements back to at least one individual source system, wherein the decisions are made on the basis of at least the respective expected future rates and the allocation rule set.

The using of the prediction model may include monitoring the received requests and determining a first rate of receipt and a second rate of receipt for each individual source system. The first rate of receipt is over a first time period and the second rate of receipt is over a second time period, which is shorter and generally more current than the first time period. Thereafter, the method comprises comparing the second rates against the respective first rates.

Thus, in an embodiment, the processing power is measured over the previous 60 minutes of activity. After every minute, the method then checks the actual processing power used by each source system against the expected processing power. Based on the previous 5 minutes of activity, the method then predicts the activity for each source system for the next minute and if more requests are being received that can be processed, the method will calculate how many requests it should actually accept from each source system to meet the expected required processing power. This calculation then determines by how much to delay the request acknowledgement for each request per source system, until the next calculation is performed one minute later. The method thus comprises periodically updating the decision with respect to the delaying of the acknowledgements.

Source systems which are active and are not meeting their defined processing power are helped by reducing their request acknowledgement delay. The overall effect is thus that over-using source systems are slowed more and under-using source systems are slowed less.

The method may thus comprise applying delays of different length on requests from different source systems. For example, if there are two source systems, A and B, each being configured to get half of the processing power, but A has not sent any requests for the first 50 minutes of the hour. If A then suddenly becomes active but B becomes inactive then the method is arranged to accept A's requests as quickly as possible. If, however, B remains active and all the requests cannot be processed on time, then B would be slowed down by delaying the request acknowledgement. When more than two source systems are involved then the extent of the acknowledgement delay has to be determined for each source system individually.

In an embodiment, the method comprises determining, in the allocation rule set, a threshold for free processing power of the system environment, and then monitoring the amount of free processing power of the system environment. When the amount of free processing power is equal to or less than the threshold, the method comprises selecting at least one of the source systems for load limitation, wherein the load limitation includes delaying the sending of the acknowledgements.

The method also includes deciding a length of the delay applied on the acknowledgements directed to a source system according delay rules in the allocation rule set.

As indicated above, the source systems, such as source systems 11, 30 and/or 113, may include at least one service provisioning system, such as provisioning system 15 described above, of the network operator, or a at least one service provisioning system of a virtual (or service) operator operating in the telecommunications network. The source systems can also include, in addition or instead of the provisioning systems, at least one client system the network operator and/or a virtual operator operating in the telecommunications network. For example, such client systems can be the client systems 113 and 11 of FIG. 1. Of course, there can also be two or more of such virtual operators.

The present invention further discloses a provisioning and activation system for a telecommunications network of a network operator, which in an embodiment is implemented within the provisioning engine 14 of the provisioning system 15. In an embodiment, the provisioning and activation system is configured to instruct telecommunications network elements in the telecommunication network to provision and activate subscriber services. The provisioning and activation system and/or the telecommunications network elements have a limited total processing power for processing service requests from receipt to respective changes in the telecommunications network elements, as described above.

In an embodiment, the provisioning and activation system thus comprises means for receiving subscriber service requests sent from a plurality of source systems 11, 30 and/or 113 and means for sending, with respect to each received request, a positive or negative acknowledgement of the request back to the respective source system based on whether the request was properly received or not. The system further comprises means for determining, with respect to each positively acknowledged request, a series of operations necessary to be performed in a group of telecommunications network elements in order to fulfil the subscriber service request, and means for sending instructions for performing the determined series of operations in each element in said group of telecommunications network elements. The provisioning and activation system includes means to maintain an allocation rule set for allocating the total processing power between the service requests received from different source systems. The provisioning and activation system is configured to delay the sending of the positive or negative acknowledgement of the request back to the respective source system, when at least one of the source systems sends more service requests than allowed according to the allocation rule set.

In yet a further embodiment, the invention comprises a computer program product for a provisioning and activation system for provisioning and activating subscriber services in telecommunications network elements in a telecommunication network of a network operator. The computer program product comprises program code means for receiving subscriber service requests sent from a plurality of source systems, program code means for sending, with respect to each received request, a positive or negative acknowledgement of the request back to the respective source system based on whether the request was properly received or not, program code means for determining, with respect to each positively acknowledged request, a series of operations necessary to be performed in a group of telecommunications network elements in order to fulfil the subscriber service request, and program code means for sending instructions for performing the determined series of operations in said group of telecommunications network elements.

The computer program product further comprises program code means for controlling the computer program product when executed in a system environment with a limited total processing power for processing service requests from receipt to respective changes in the telecommunications network elements. The controlling means comprises an allocation rule set for allocating the total processing power between the service requests received from different source systems, with the controlling means being configured to delay the sending of the positive or negative acknowledgement of the request back to the respective source system, when at least one of the source systems sends more service requests than allowed according to the allocation rule set.

Figure 5:
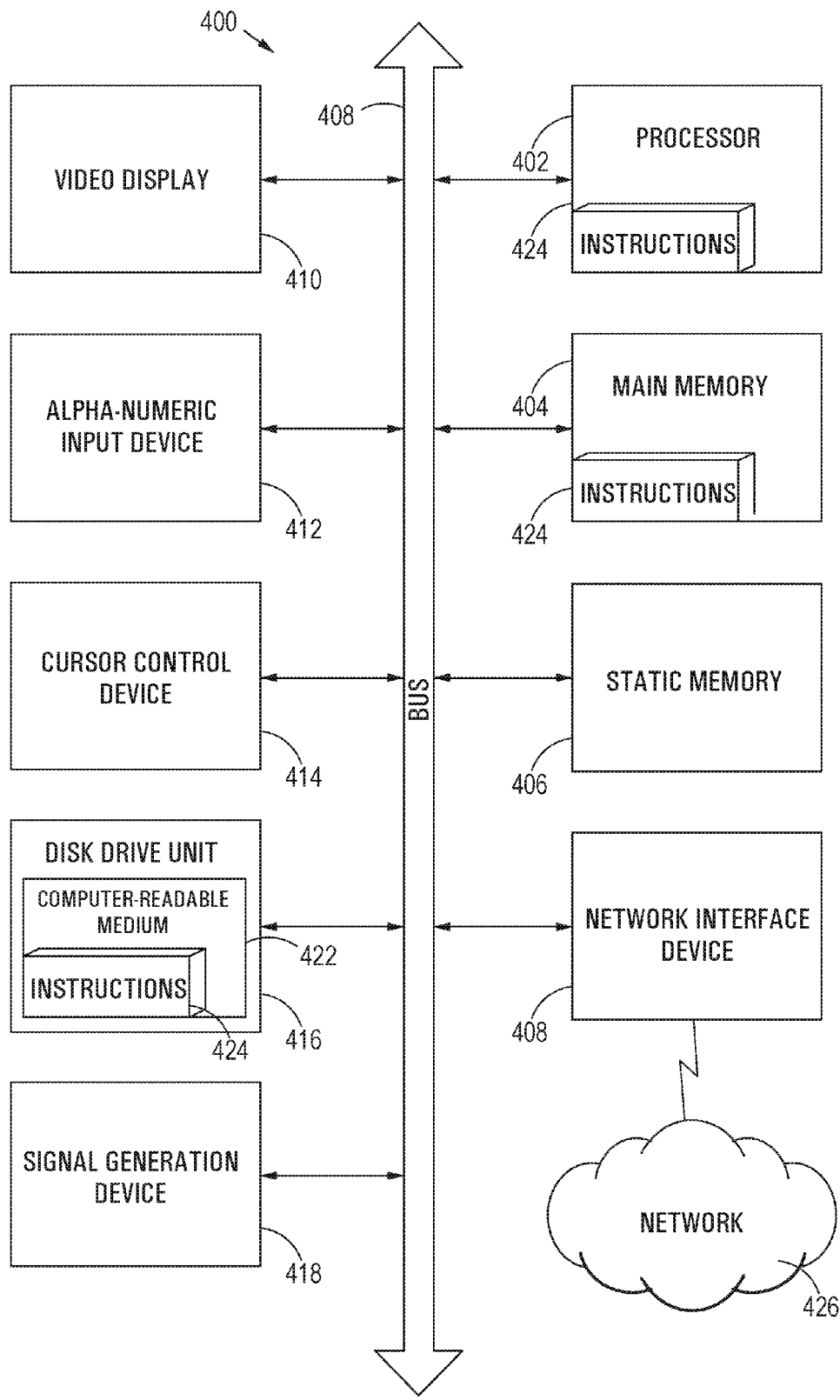
FIG. 5 shows a computer system within which a set of instructions, for causing the computer system to perform any one or more of the methodologies discussed herein, may be executed.

In FIG. 5, a diagrammatic representation of a computer 400 is shown within which a set of instructions, for causing the computer 400 to perform any one or more of the methodologies described herein, may be executed. In a networked deployment, the computer 400 may operate in the capacity of a server or a client machine in server-client network environment, or as a peer machine in a peer-to-peer (or distributed) network environment. The computer 400 may be a personal computer (PC), a tablet PC, a set-top box (STB), a Personal Digital Assistant (PDA), a cellular telephone, a web appliance, a network router, switch or bridge, or any computer 400 capable of executing a set of instructions (sequential or otherwise) that specify actions to be taken by that computer 400. Further, while only a single computer 400 is illustrated, the term "computer" shall also be taken to include any collection of computers that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both, a main memory 404 and a static memory 406, which communicate with each other via a bus 408. The computer 400 may further include a video display unit 410 (e.g., a liquid crystal display (LCD)). The computer 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a computer-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting computer-readable media.

The software 424 may further be transmitted or received over a network 426 via the network interface device 420 utilizing any one of a number of well-known transfer protocols (e.g., HTTP, FTP).

While the computer-readable medium 422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer 400 and that cause the computer 400 to perform any one or more of the methodologies of the present embodiments, or that is capable of storing, encoding or carrying data structures utilized by or associated with such a set of instructions. The term "computer-readable medium" shall accordingly be taken to include, but not be limited to, solid-state memories and optical and magnetic media.

The invention claimed is:

1. A method of provisioning and activating subscriber services in telecommunications network elements in a telecommunication network of a network operator, the method comprising:
   receiving subscriber service requests sent from a plurality of source systems;
   for each received request, sending a positive or negative acknowledgement of the request back to the respective source system based on whether the request was properly received or not;
   for each positively acknowledged request, determining a series of operations necessary to be performed in a group of telecommunications network elements in order to fulfil the subscriber service request; and
   performing the determined series of operations whereby at least one change of state occurs in each element in said group of telecommunications network elements;
   wherein the method is executed in a system environment with a limited total processing power for processing service requests from receipt to respective changes in the telecommunications network elements; and
   if the processing load imposed by all the received requests exceeds the total processing power, delaying the sending of the positive and/or negative acknowledgements back to the respective source system.

2. The method of claim 1, further comprising:
   defining, in an allocation rule set, guaranteed processing power values for at least some of the source systems;
   comparing the processing loads imposed by the requests received from individual source systems against the respective guaranteed processing power values; and
   when the processing load imposed by all the received requests exceeds the total processing power, delaying the sending of the acknowledgements back to at least one source system that sends requests at a higher rate than can be processed using the processing power guaranteed for the respective source system.

3. The method of claim 1, further comprising:
   using a prediction model to calculate an expected future rate of receipt of requests for each individual source system; and
   making decisions on whether or not to delay the sending of the acknowledgements back to at least one individual source system, wherein the decisions are made on the basis of at least the respective expected future rates and the allocation rule set.

4. The method of claim 3, wherein the using of the prediction model comprises:
   monitoring the received requests and determining a first rate of receipt and a second rate of receipt for each individual source system, wherein the first rate of receipt is over a first time period and the second rate of receipt is over a second time period, which is shorter and generally more current than the first time period; and
   comparing the second rates against the respective first rates.

5. The method of claim 1, further comprising:
   determining, in the allocation rule set, a threshold for free processing power of the system environment;
   monitoring the amount of free processing power of the system environment; and
   when the amount of free processing power is equal to or less than the threshold, selecting at least one of the source systems for load limitation, wherein the load limitation includes delaying the sending of the acknowledgements.

6. The method of claim 1, further comprising:
   deciding a length of the delay applied on the acknowledgements directed to a source system according to delay rules in the allocation rule set.

7. The method of claim 1, further comprising periodically updating the decision with respect to the delaying of the acknowledgements.

8. The method of claim 1, wherein the source systems comprise:
   at least one service provisioning system of the network operator, and/or
   at least one client system of the network operator.

9. The method of claim 1, wherein the source systems comprise:
   at least one service provisioning system, and/or
   at least one client system of a virtual operator operating in the telecommunications network.

10. The method of claim 1, further comprising applying delays of different length on requests from different source systems.

11. The method of claim 1, further comprising sending the positive and/or negative acknowledgements back to the respective source system immediately without a delay when the processing load imposed by all the received requests is less than the total processing power.

12. A provisioning and activation system for a telecommunications network of a network operator, the provisioning and activation system configured to instruct telecommunications network elements in the telecommunication network to provision and activate subscriber services, the provisioning and activation system and/or the telecommunications network elements having a limited total processing power for processing service requests from receipt to respective changes in the telecommunications network elements, the provisioning and activation system comprising:
   a network interface device configured to receive subscriber service requests sent from a plurality of source systems and send, with respect to each received request, a positive or negative acknowledgement of the request back to the respective source system based on whether the request was properly received or not; and
   a processor and memory having instructions for causing the processor to:
      determine, with respect to each positively acknowledged request, a series of operations necessary to be performed in a group of telecommunications network elements in order to fulfil the subscriber service request;
      send instructions for performing the determined series of operations in each element in said group of telecommunications network elements; and
      maintain an allocation rule set for allocating the total processing power between the service requests received from different source systems;
   wherein the provisioning and activation system is configured to delay the sending of the positive or negative acknowledgement of the request back to the respective source system, when at least one of the source systems sends more service requests than allowed according to the allocation rule set.

13. A computer program product stored on a non-transitory computer readable medium, said computer program product for a provisioning and activation system for provisioning and activating subscriber services in telecommunications network elements in a telecommunication network of a network operator, the computer program product comprising:
program code for receiving subscriber service requests sent from a plurality of source systems;
program code for sending, with respect to each received request, a positive or negative acknowledgement of the request back to the respective source system based on whether the request was properly received or not;
program code for determining, with respect to each positively acknowledged request, a series of operations necessary to be performed in a group of telecommunications network elements in order to fulfil the subscriber service request;
program code for sending instructions for performing the determined series of operations in said group of telecommunications network elements; and
program code for controlling the computer program product when executed in a system environment with a limited total processing power for processing service requests from receipt to respective changes in the telecommunications network elements;
wherein the program code for controlling comprises an allocation rule set for allocating the total processing power between the service requests received from different source systems; and program code configured to delay the sending of the positive or negative acknowledgement of the request back to the respective source system, when at least one of the source systems sends more service requests than allowed according to the allocation rule set.

14. The method of claim 2, further comprising:
using a prediction model to calculate an expected future rate of receipt of requests for each individual source system; and
making decisions on whether or not to delay the sending of the acknowledgements back to at least one individual source system, wherein the decisions are made on the basis of at least the respective expected future rates and the allocation rule set.

15. The method of claim 2, further comprising sending the positive and/or negative acknowledgements back to the respective source system immediately without a delay when the processing load imposed by all the received requests is less than the total processing power.

16. The system of claim 12, wherein the memory further comprises instructions for causing the processor to:
define, in the allocation rule set, guaranteed processing power values for at least some of the source systems; and
compare the processing loads imposed by the requests received from individual source systems against the respective guaranteed processing power values;
wherein the system is configured to delay the sending of the acknowledgements back to at least one source system that sends requests at a higher rate than can be processed using the processing power guaranteed for the respective source system, when the processing load imposed by all the received requests exceeds the total processing power.

17. The system of claim 12, wherein the memory further comprises instructions for causing the processor to:
maintain a prediction model to calculate an expected future rate of receipt of requests for each individual source system; and
decide on whether or not to delay the sending of the acknowledgements back to at least one individual source system, wherein the decisions are made on the basis of at least the respective expected future rates and the allocation rule set.

18. The system of claim 12, further configured to send the positive and/or negative acknowledgements back to the respective source system immediately without a delay when the processing load imposed by all the received requests is less than the total processing power.

19. The computer program product of claim 13, further comprising:
program code for defining, in the allocation rule set, guaranteed processing power values for at least some of the source systems;
program code for comparing the processing loads imposed by the requests received from individual source systems against the respective guaranteed processing power values; and
the program code for controlling is configured to delay the sending of the acknowledgements back to at least one source system that sends requests at a higher rate than can be processed using the processing power guaranteed for the respective source system, when the processing load imposed by all the received requests exceeds the total processing power.

20. The computer program product of claim 13, further comprising:
program code for maintaining a prediction model to calculate an expected future rate of receipt of requests for each individual source system; and
program code for making decisions on whether or not to delay the sending of the acknowledgements back to at least one individual source system, wherein the decisions are made on the basis of at least the respective expected future rates and the allocation rule set.

21. The computer program product of claim 13, wherein the program code for controlling is configured to send the positive and/or negative acknowledgements back to the respective source system immediately without a delay when the processing load imposed by all the received requests is less than the total processing power.

* * * * *